UNITED STATES PATENT OFFICE.

CLIFFORD SHATTOCK, OF DETROIT, MICHIGAN.

VALVE-GRINDING COMPOSITION.

1,386,432.        Specification of Letters Patent.        Patented Aug. 2, 1921.

No Drawing.        Application filed June 1, 1921. Serial No. 474,203.

*To all whom it may concern:*

Be it known that I, CLIFFORD SHATTOCK, a citizen of the United States, residing at Detroit, in the county of Wayne and State of Michigan, have invented new and useful Improvements in Valve-Grinding Compositions, of which the following is a specification.

My present invention has for its object the provision of a composition adapted when applied to valves to materially facilitate the grinding thereof.

My composition consists of a solution of lye, grease and water mixed with carborundum and ground-glass.

In preparing the composition I prefer to use the constituents of the solution alluded to in about the following proportions—viz., one-half pint of lye, five pounds of grease, and three gallons of water. These ingredients are boiled together for about two hours, and the solution is permitted to become cold before being used.

The carborundum and ground glass are thoroughly mixed together in the proportions of one pound of the former to one fourth of a pound of the latter, and to this combination is added one-half pint of the described solution, the whole being then well mixed to intimately associate the carborundum, ground glass and solution, after which the composition is ready for use.

Subsequently to use of the composition in valve grinding and other grinding operations to which it is applicable, water alone is employed to wash the composition from the ground surfaces.

Having described my invention, what I claim and desire to secure by Letters-Patent, is:—

A grinding composition consisting of one pound of carborundum, one-fourth of a pound of ground glass, and one-half pint of a solution made up of lye one-half pint, grease five pounds, and water three gallons.

In testimony whereof, I affix my signature.

CLIFFORD SHATTOCK.